(12) United States Patent
    Wainwright

(10) Patent No.: US 6,382,825 B1
(45) Date of Patent: May 7, 2002

(54) INTERIOR ILLUMINATION FOR PORTABLE STRUCTURES

(76) Inventor: Harry Lee Wainwright, 918 Delaware Ave., Bethlehem, PA (US) 18015

( * ) Notice: Subject to any disclaimer, the term of this patent is extended or adjusted under 35 U.S.C. 154(b) by 0 days.

(21) Appl. No.: 09/685,128

(22) Filed: Oct. 10, 2000

(51) Int. Cl.[7] ..................... F21W 131/40; F21W 131/00
(52) U.S. Cl. ........................................ 362/576; 362/145
(58) Field of Search ................................ 362/576, 552, 362/554, 145, 551

(56) References Cited

U.S. PATENT DOCUMENTS

| | | | | |
|---|---|---|---|---|
| 4,408,260 A | * | 10/1983 | Miedel | 362/576 |
| 5,107,637 A | * | 4/1992 | Robbins | 362/146 |
| 5,911,500 A | * | 6/1999 | Barnett et al. | 362/145 X |
| 5,931,561 A | * | 8/1999 | Broderick | 362/145 |

\* cited by examiner

Primary Examiner—Laura K. Tso
(74) Attorney, Agent, or Firm—Sanford J. Piltch, Esq.

(57) ABSTRACT

The present invention is an interior illumination system utilizing one or more optical fibers that have one or more sections of an outer protective coating removed in predetermined areas and shapes along the length of the fiber. These fibers may then be arranged in groupings or designs at one or more points within the interior of the structure and secured in place via a transparent sheet that is attached to the wall of the structure. Light is then introduced from at least one end of the fibers by one or more light sources so that the area adjacent to the optical fiber groupings is illuminated. Further, the present invention also allows for the intensity of light to be adjusted by a control based upon the light effects desired and to switch the lights on and off.

8 Claims, 2 Drawing Sheets

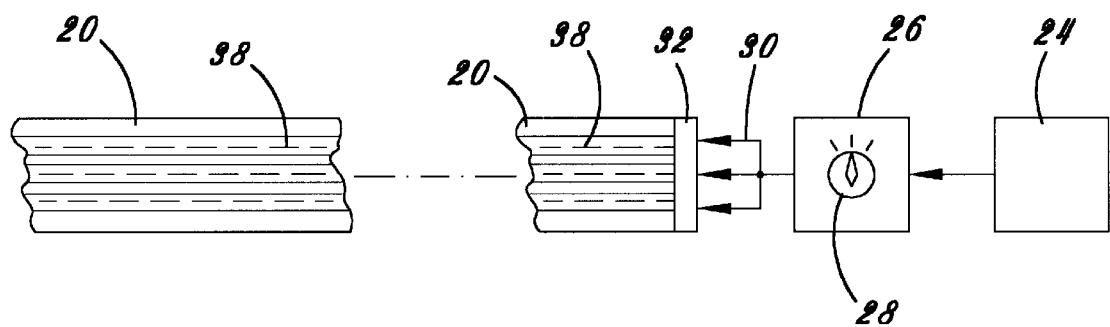
_Fig. 4_
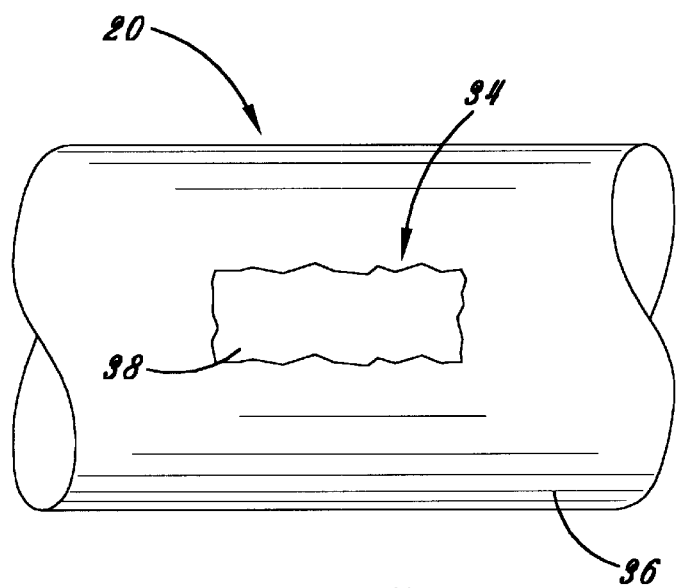
_Fig. 5_

INTERIOR ILLUMINATION FOR PORTABLE STRUCTURES

The present invention deals with a superior method of interior illumination using an optical fiber system for utilization in portable structures to uniformly illuminate the interior. While a tent will be used as the primary example of a portable structure in the following explanation, it is to be understood that virtually any structure may be equipped with the illumination system of the present invention for the same purposes.

Portable structures, such as tents, are currently being utilized for many types of activities including weddings, parties, political gatherings, picnics and the like. However, when it becomes dark, the user is forced to rely upon lighting means such as candles or lamps, to adequately illuminate the interior. Candles pose a significant fire hazard within the structure due the open flame. If the candle is knocked over or hot wax drips onto a flammable material, a fire may result and cause the portable structure to ignite as well. Further, candles provide minimal lighting in such a structure, and are not good choices if proper or variable lighting is desired.

Lamps are a popular alternative to candies; however, lamps also pose a significant safety hazard as well, although to a somewhat lesser degree. In order to achieve the proper lighting, halogen lamps are generally the lamps of choice because they currently provide the brightest lighting available. However, while they may provide the best lamp lighting, the halogen bulb used in the lamp becomes dangerously hot during use. Should the lamp be placed too close to the structure material, inadvertently knocked over, or a piece of debris falls into it, the bulb could set the material or debris on fire, causing a very unsafe situation within the structure. Further, both lamps and candies emit a large amount of excess heat to the surrounding atmosphere, often making the tent uncomfortably warm for those inside. In contradistinction, the optical fibers used in the present invention emit virtually no heat whatsoever, which alleviates the unnecessary fire hazard of an overly heated fixture as well as uncomfortable temperature conditions within the portable structure.

Thus, there is a need for safe, illumination of interior structures that is able to overcome the hazardous setbacks of prior methods, without sacrificing the quality of lighting desired. Although a tent is used to describe the present invention, it is purely for exemplary means and it is to be understood that the illumination system of the present invention may be used in virtually any structure without departing from the spirit or scope of the present invention.

It is, therefore, an object of the present invention to eliminate the need for hazardous candles and lamps for the interior illumination of a portable structure, such as a tent, by providing a safe alternative, which is self-contained on the surface of the structure and provides an equivalent, if not a greater, amount of interior light, while substantially reducing unnecessary and dangerous radiation of heat.

It is a further object of the present invention to allow the user to control the intensity of the light emitted from the power source to the optical fibers either by using a manual control, which allows a wide range of intensities from dim to very bright, or by requesting a pre-determined intensity to be installed on the interior surface of the structure.

It is another object of the present invention to provide an alternative to poor lighting conditions associated with the use of the earlier, dated methods, by equipping the interior of the structure with uniform arrangements of light positioned at pre-determined locations along the portable structure interior, thus providing a superior illumination of the structure interior never before achieved.

Other objects will appear hereinafter.

SUMMARY OF THE INVENTION

The present invention provides superior illumination means by use of optical fibers arranged in bundles or groups that are affixed to the interior surface of a structure, such as a tent, at pre-determined points. More specifically, the optical fibers that are to be arranged around the interior have one or more pre-determined portions of the outer reflective covering of the optical fiber removed to provide improved lighting. Prior to removing the reflective coating, light enters from one end of the optical fiber from a light source and is carried through the optical fiber to the opposite end, with substantially little or no light emitted from the area in between the two ends because the reflective coating inwardly reflects any spurious light beams. However, when one or more portions of the outer coating are removed, intense light is emitted through the areas along the entire length of the fiber, thus providing a pre-determined amount of light to illuminate the interior of a structure. The amount of light required depends on the interior size, number of optical fibers used, the dimensions and number of areas from which the reflective coating is removed, and orientation of optical fiber groups.

Also described is an optional control for the fiber optic bundles that allows the user to turn the light source on and off, as well as control the intensity of the light emitted from the light source. Thus, the user may adjust the intensity of the light emitted from the optical fibers surrounding the interior perimeter of the structure based on the lighting conditions desired. Alternatively, a manual controller may not be included, meaning that the optical fibers will be attached to a light source of a pre-determined intensity, which may or may not be chosen by the user in advance.

The present invention goes further to describe a containment means for securing the optical fibers in pre-determined arrangements against the interior of the portable structure. The bundles are held securely in their orientation via a transparent sheet that covers the outward facing fibers. The sheet is attached via attachment means, i.e., sewn (as shown) or adhesive (not shown), to the interior material of the structure around the outermost perimeter of the fiber group thus creating a "pocket" for the fibers to rest securely in. The optical fiber bundles are presently shown in an exemplary orientation, however, it is to be understood that any orientation of the optical fiber bundles, e.g., a design, pattern, etc, is acceptable and within the spirit of the present invention. Further, should the interior material of the portable structure be plastic, or some other reflective material, additional illumination of the interior would be achieved by reflection of the light off the material towards the room and would be preferred, although any type of material is suitable and would be acceptable for use with the present invention.

In summary, the present invention is an interior illumination system utilizing one or more optical fibers that have one or more sections of an outer protective coating removed from each fiber in pre-determined areas and shapes along the length of the fibers such that light introduced from one or more ends of said fibers escapes from the areas of exposed optical fiber core. These fibers may then be placed in one or more groupings which are positioned in pre-selected locations through and along the exterior walls of a portable structure, such as a tent, for illumination of the interior of the structure. The groupings of optical fibers are then affixed to the interior of the structure by one ore more transparent sheets connected directly to the inside wall of the exterior wall of the portable structure to support the groupings of optical fibers and retain the groupings in a pre-determined orientation or design. The groupings may be placed in horizontal arrays at one or more heights around the perimeter walls of the portable structure.

These groupings may then be coupled to one or more lights sources and that have pre-determined light intensity settings. Alternatively, the light sources may have adjustable light intensities, in which case, the system would further comprise a light intensity control with control means for switching on and off and varying the intensity of the light emitted.

BRIEF DESCRIPTION OF THE DRAWINGS

For the purpose of illustrating the invention, there is shown in the drawings forms that are presently, preferred; it being understood, however, that the invention is not limited to precise arrangements and instrumentalities shown.

FIG. 4 is a diagrammatic view of the intensity control device attached to a coupling device, light source, splitter and a plurality of optical fibers.

FIG. 5 is a perspective side view of an optical fiber of the present invention showing a pre-determined portion of the protective outer coating removed to allow the light from the inner fiber core to escape and illuminate the interior area adjacent to the optical fibers.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
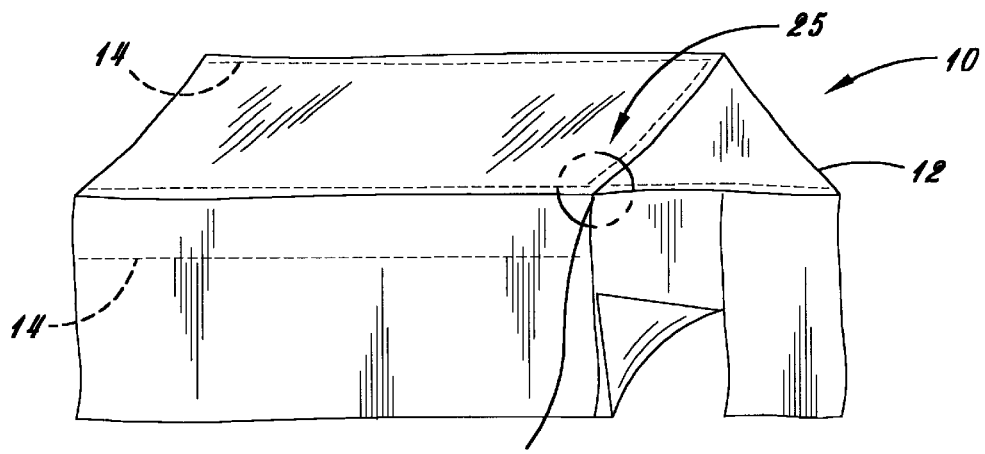
FIG. 1 is a perspective view of the portable structure of the present invention showing the seams of the interior transparent sheet in a possible orientation.

Referring now to the drawings in detail, where like numerals refer to like parts or elements, there is shown in FIG. 1 a portable structure 10, which in the present case is a tent, although virtually any structure would be acceptable. Portable structure 10, as shown in FIG. 1, is comprised of exterior material 12 and seams 14. The material may be woven cotton or a similar material exhibiting resistance to tearing and be treated with a water repellant chemical to resist weather. Another material which could be used is nylon, which exhibits the same properties or characteristics as that described above. The structure is supported with a rib-like frame (not shown) with tie-down ropes (also not shown) for additional structural integrity.

Figure 2:
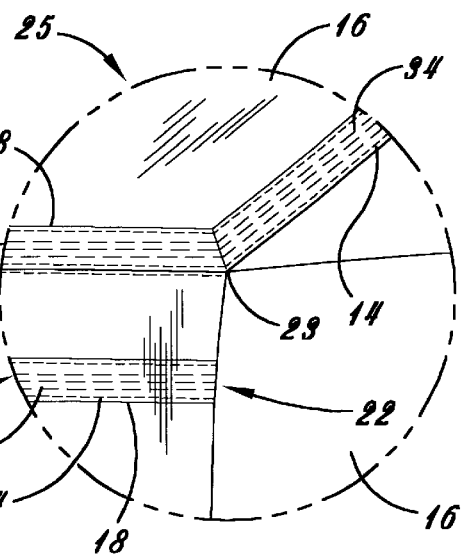
FIG. 2 is an enlarged sectional interior view of an exterior corner of the portable structure of FIG. 1.

FIG. 2 shows an enlarged view 23 of the interior of corner 25, located in FIG. 1. Interior 16 contains optical fibers 20, which may be bundled or grouped accordingly, in a generally horizontal direction, although any orientation is acceptable. Fibers 20 are shown here lining the lower perimeter of the roof portion and a section of one wall of the portable structure 10. However, it is to be understood that any orientation or design of the fibers 20 (or groups of fibers 22) would be well within the scope of the present invention. Fibers 20 are maintained in position by a transparent sheet 18, which overlies the fibers 20 and is affixed along the interior 16 on either side of fiber bundles 22 at seams 14, as shown in FIGS. 1 and 2. Also shown in FIG. 2, are areas 34 on fiber 20 that show portions of outer protective sheath 36 removed. This exposes the inner fiber 38 as shown in more detail in FIG. 5. The size, number, and orientation of removed areas 34 are pre-determined and may vary depending on the size of the interior of the structure, lighting effects desired within the structure, and the number of fibers 20 used in the bundle 22.

Figure 3:
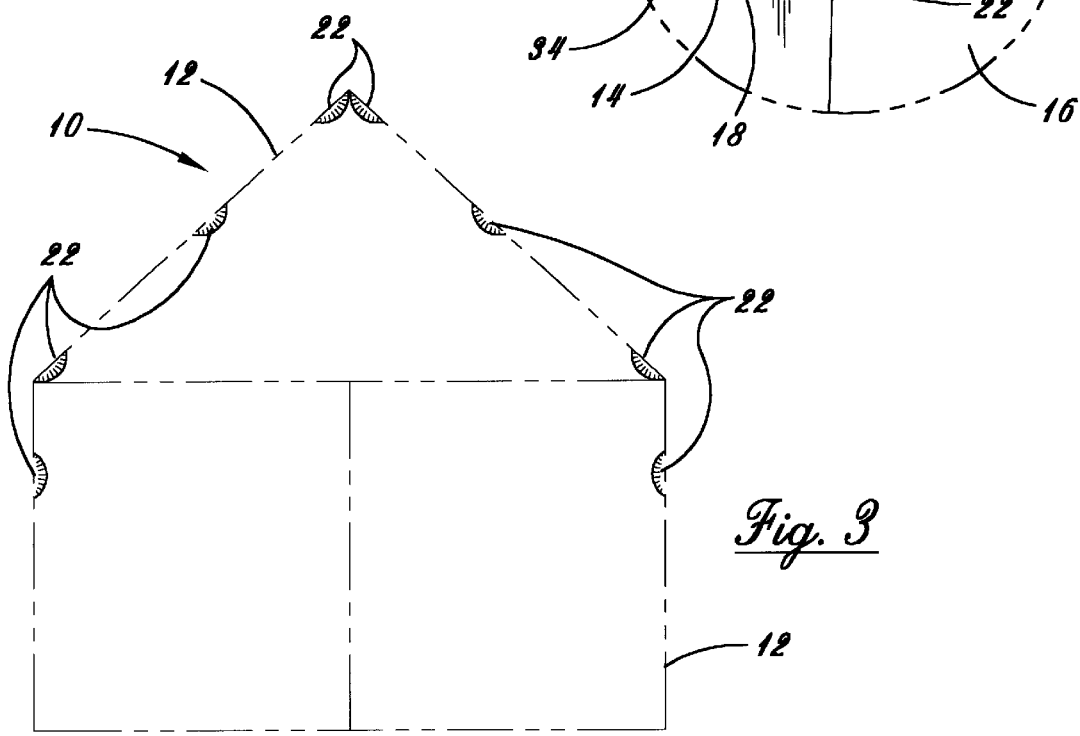
FIG. 3 is an interior front sectional view of the portable structure of the present invention showing possible orientations of optical fiber bundle illumination sections.

FIG. 3 is a front sectional view showing an acceptable orientation of optical fiber bundles 22 arrayed along the interior of structure 10. As shown in FIG. 3, bundles 22 are strategically placed in areas that will create a uniform lighting of the interior, not achieved by earlier methods of illumination using incandescent, fluorescent, or fossil fuel. Should the material of interior 16 be constructed of reflective material, the illumination effect of bundles 22 would be greatly enhanced. The orientation of bundles 22 in FIG. 3, is merely exemplary and is not intended in a limiting manner.

Further, as shown in FIG. 4, the intensity of the light emitted from optical fibers 20 or from the bundles 22 may be controlled by an intensity control 26. Control 26 includes an on/off and intensity control in the form of dial 28, which when turned clockwise or counterclockwise provides electrical power to the optical fiber groups 22. Dial 28 also varies the intensity of light emitted from the optical fiber light source(s) over a pre-selected range from dim to very bright. Intensity control 26 is attached to a source of electrical power 24, that is preferred to be a portable dc power source having extended life in the range of hundreds of hours with a increased wattage output to accommodate a plurality of optical fiber light sources. Power source 24 provides electrical energy to the intensity control 28 which is configured to produce varying levels of electrical output power to the coupling device 32 containing the optical fiber light source (s). Circuit network 30, which in the present case is shown with three lines corresponding to the three fibers 20, which are to be illuminated, is only one such network configuration within the scope of the invention. Other circuit networks could carry differing electrical power levels causing a variety of light source output levels to the optical fibers 20. This would necessitate multiple outputs to the network 30 from control 26 as well as modification to the intensity dial control 28 to cause one or more optical fiber bundles 22 to be illuminated at different light levels.

The network 30 connects the control 26 to the coupler 32, which contains one or more light sources connected on their input side to the network 30 and on the light output side to the various optical fiber bundles 22. As such, coupling device 32 contains the illumination source(s), which are coupled to optical fibers 20 with the illumination intensity controlled by light intensity control 26. As discussed above, intensity control 26 permits varying of the intensity of the light emitted from each of the light sources in the coupler 32 intensity of the light emitted from coupler 32 with the same intensity of light emitted through all the fibers 20, and ultimately through each of the bundles 22 coupled to the several light sources. The light at a pre-selected intensity in accordance with the light level selected through dial 28 of light intensity control 26, will be transmitted through each of the optical fibers 20 (with each light source emitting a light intensity level according to the configuration of the interconnecting circuit network 30) so that light is transmitted along the length of each optical fiber 20 escaping through the plurality of areas 34 in which the outer protective coating 36 has been removed from each fiber.

FIG. 5 shows in closer detail a segment of an optical fiber 20 with an area 34, which has had the exterior protective coating 36 removed to expose the fiber core 38. One or more areas 34 of exterior protective coating 36 are removed at pre-determined locations from surrounding inner core 38 such that light may escape from the exposed area 34 of the fiber core 38. Although the area 34 is shown as a rectangular shape, exterior protective (inwardly reflective) coating 36 may have any shape, e.g. square, oblong, triangular, etc, spaced along the length of the fiber 20 without departing from the spirit of the present invention. Without removing the protective outer coating 36, when light is directed through optical fiber 20, the coating 36 causes the light to be reflected inward toward the distal end of the fiber along the length of fiber core 38. However, as shown in FIG. 5, when exterior internally reflective coating 36 is removed from fiber core 38, the concentrated light is allowed to escape through the area 34 of removed coating and illuminate the area immediately adjacent to the optical fiber 20. While it may be advantageous to remove the entire coating 36, fibers 20 would then have to be shortened to compensate for the loss of light intensity since most of the light will escape in the proximal sections of fiber 20. The size, shape and number of exposed areas 34 depends on the length of optical fiber 20, size of the area to be illuminated, and the lighting intensity desired, all of which may be pre-selected or varied as deemed necessary.

In order to more adequately provide specific pre-selected light intensity levels within the portable structure 10 or any other space in which illumination of a specified area is desired, the bundles 22 of optical fibers 20 may be coupled at each of their respective ends to a coupler 32 which are, in turn, connected to a circuit network 30 and light intensity control 26. In this configuration the optical fiber bundles 22 can be controlled to emit the same, or different, intensities through the respective exposed area 34 of the optical fiber core 38. As described, the system of illumination of the interior of a structure, or a specified space, will provide a more uniform level of emitted intensity of light (illumination) by having light sources coupled to each end of the one or more bundles 22 of optical fibers 20.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. An interior illumination system utilizing one or more optical fibers that have one or more sections of an outer protective coating removed from each fiber in pre-determined areas and shapes along the length of said fibers such that light introduced into at least one end of said fibers escapes from said areas of exposed optical fiber core; said one or more fibers being placed in one or more groupings which are positioned in pre-selected locations throughout and along the exterior walls of a portable structure for illumination of the interior of said structure.

2. The system of claim 1 wherein said groupings of optical fibers are affixed to the interior of the structure by one or more transparent sheets connected directly to the inside wall of the exterior of the structure to support said groupings of optical fibers and retain said groupings of optical fibers in a pre-determined orientation.

3. The system of claim 1 wherein said groupings of optical fibers are coupled to one or more light sources.

4. The structure of claim 1 wherein said portable structure is a tent.

5. The system of claim 2 wherein said fiber orientation is arranged in a pre-determined design.

6. The system of claim 2 wherein said fiber groupings of optical fibers are placed in horizontal arrays at one or more heights around the perimeter walls of said portable structure.

7. The system of claim 3 wherein said groupings of optical fibers coupled to one or more light sources have pre-determined light intensity settings, said settings being adjustable to vary the light intensity.

8. The system of claim 7 further comprises a light intensity control with control means for switching on and off and varying the intensity of light emitted.

* * * * *